Jan. 11, 1966     W. WEZEL     3,228,437
CHAIN SAW AND BLADE THEREFOR
Filed March 1, 1963     3 Sheets-Sheet 1
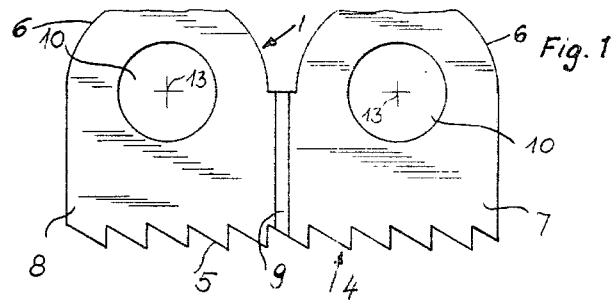
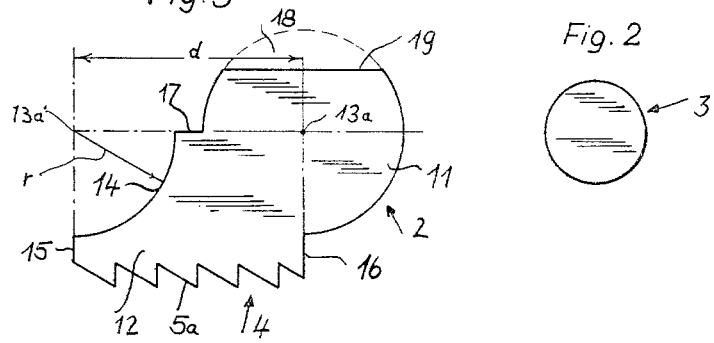
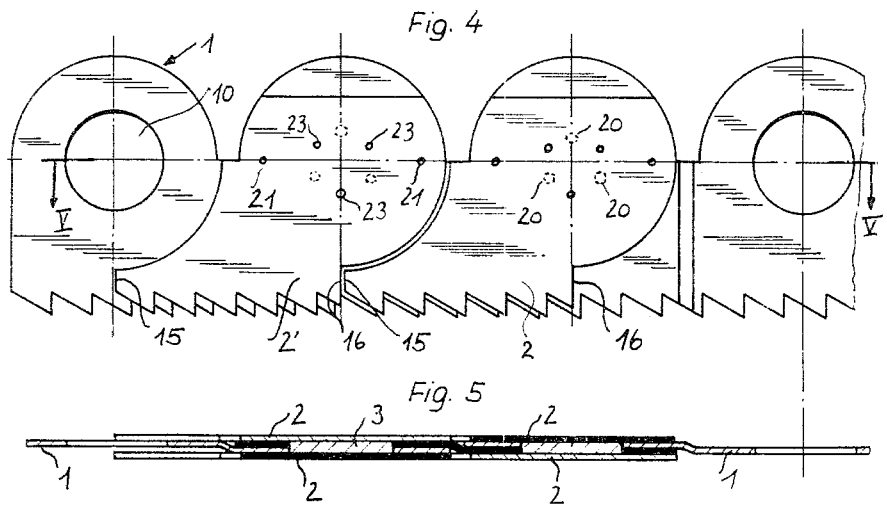
WALTER WEZEL
*INVENTOR.*
BY *Mestern, Ross & Mestern*

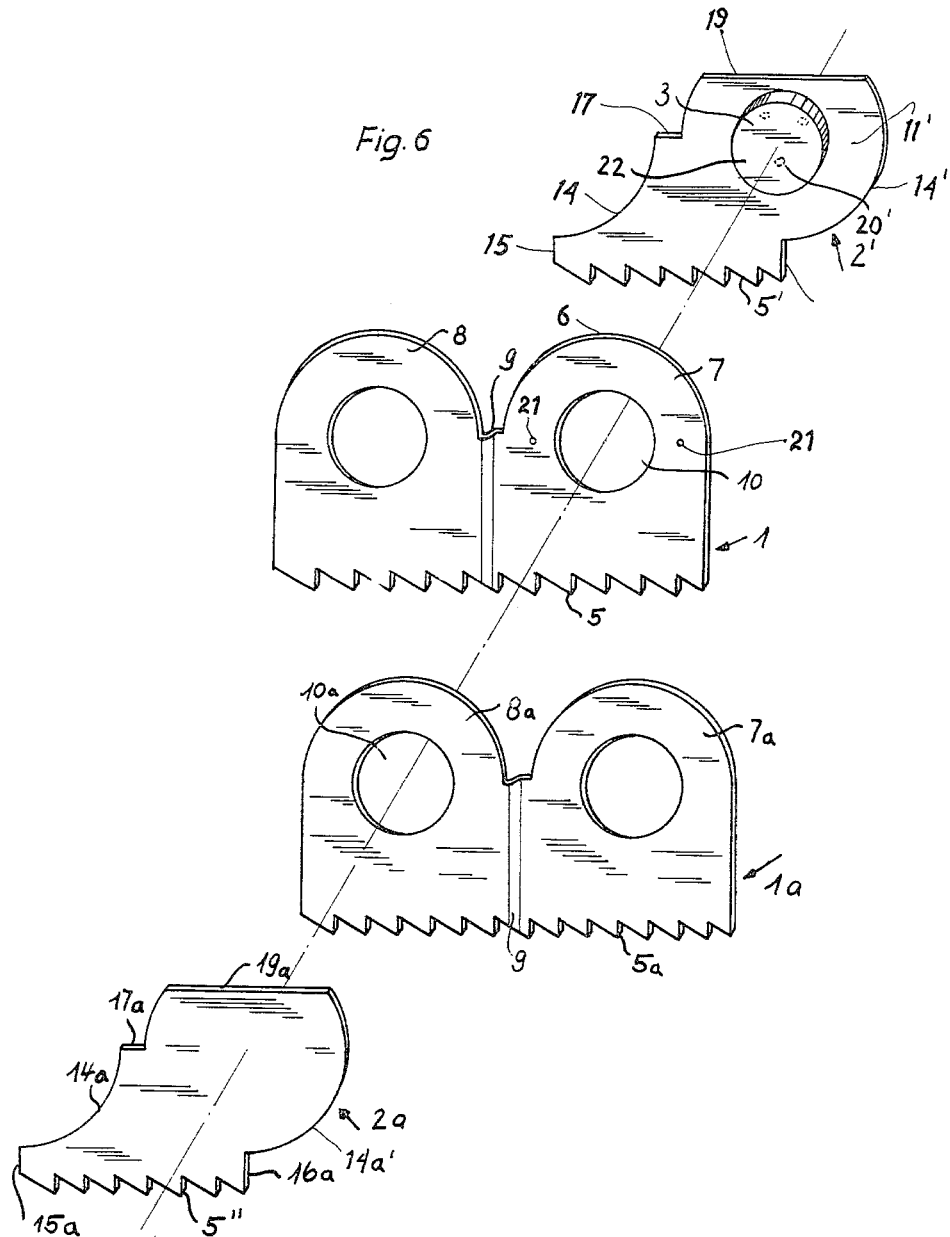

Jan. 11, 1966 W. WEZEL 3,228,437
CHAIN SAW AND BLADE THEREFOR
Filed March 1, 1963 3 Sheets-Sheet 3
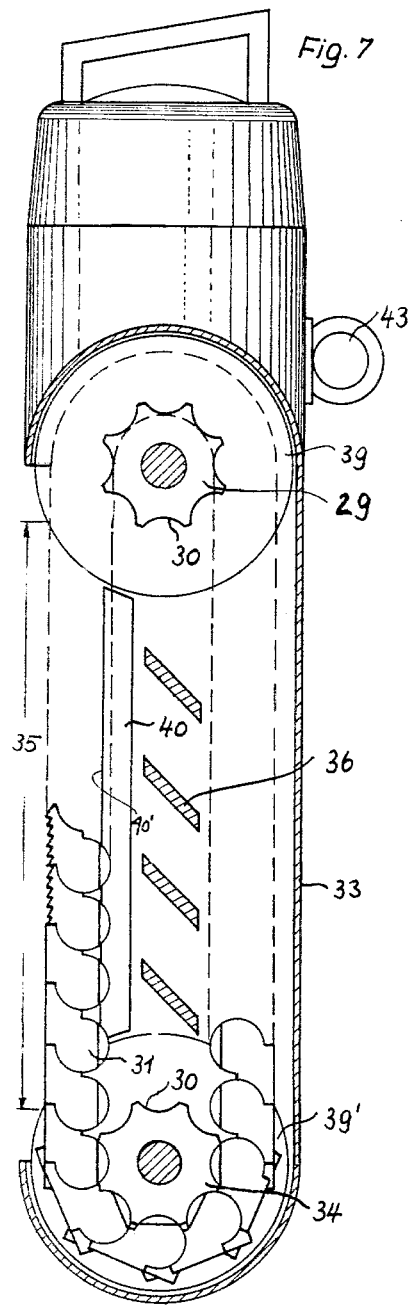
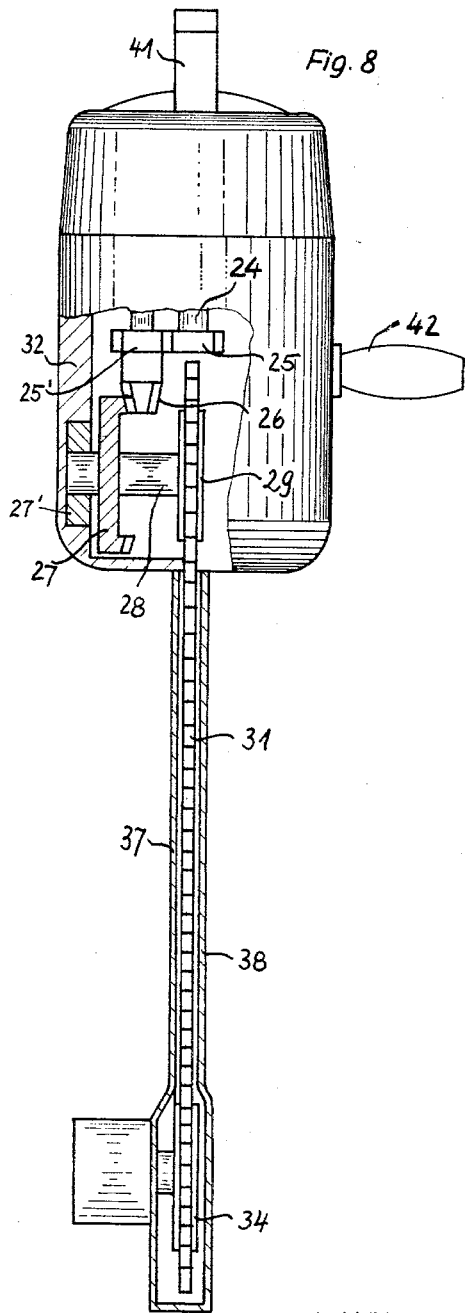
WALTER WEZEL
INVENTOR.
BY *Mestern, Ross & Mestern*

United States Patent Office 3,228,437
Patented Jan. 11, 1966

3,228,437
CHAIN SAW AND BLADE THEREFOR
Walter Wezel, Maulbronn, Wurttemberg, Germany, assignor to Schmid & Wezel, Maulbronn, Wurttemberg, Germany
Filed Mar. 1, 1963, Ser. No. 262,128
Claims priority, application Germany, June 29, 1962, Sch 31,681
13 Claims. (Cl. 143—135)

The present invention relates to chain-saw blades and apparatus for using same, as well as to an improved method of making these blades.

While chain saws are well known in the lumbering industry, their use has been more or less confined to this trade since most known types of chain-saw blades tended to operate by a tearing action rather than a cutting action. These blades have generally comprised roller links which lie substantially in the plane of their pivotal axes and have blade members extending perpendicularly therefrom. Such saw blades are totally unsuited for use in slaughterhouses and the like for the subdivision of animal carcasses since they result in a shredding of the usable portion of the carcass and, consequently, considerable wastage. In the meat-packing industry it is common, therefore, to divide an animal carcass with the use of manually reciprocated saws, an operation which is time consuming and cumbersome. In addition, a manually operated saw tends to slip from time to time resulting in a tearing of the meat alongside the cut.

It is an object of the present invention to provide a chain saw suitable for use in the meat-packing industry and adapted to sever portions of animal carcasses neatly, cleanly and at a high rate.

It is another object of the invention to provide an improved blade for a chain saw which is both stable and capable of fine cutting while obviating the aforementioned disadvantages.

Yet another object of the invention is to provide an improved method of making a chain-saw blade.

According to a feature of the present invention a chain-saw blade which is free from chattering, lightweight and corrosion resistant can be formed from a corrosion resistant sheet metal, such as stainless-steel sheet metal, by stamping therefrom a plurality of relatively thin links which are joined in a generally planar array with the links each overlapping a pair of adjacent links on opposite sides thereof while being articulated thereto by individual pivot means spaced along the array. Preferably, each of the links is formed with two mutually parallel portions relatively off-set transverse to the plane of the array by a distance equal substantially to the thickness of the links with the forward portion of each link overlying a rearward portion of a forward link. This construction results in the formation of a chain-saw blade whose thickness is approximately twice that of the single link but which can nevertheless be considerably thinner than hitherto existing blades without a decrease in the strength of the chain since adjacent links are in surface contact and vibration or chattering transverse to the plane of the array is eliminated. In addition, a pair of generally flat outer members, which may also be stamped from relatively thin sheet metal flanks the intermediate link members and is rigidly secured to a pintle constituting the aforementioned pivot means. The pintle, which has a length approximately equal to twice the thickness of the sheet material from which the links are stamped, is received within a pair of registering bores provided in the aligned surfaces of the adjacent links. The outer members can, like the inner link members, be formed with a linear array of teeth so that, in fact, the blade is constituted by four rows of such teeth. The teeth of the outer members can be either aligned with or longitudinally offset from the teeth of the links.

To permit free rotation of the links relative to one another, they are each formed with a pair of arcuate inner edges concentric with the respective pivot means and having a diameter less than the breadth of the offset portions. Similarly, the outer members can be provided with convex portions extending, say, over three quadrants or 270° so as to be relatively rotatable with respect to an adjacent outer member which is formed with a correspondingly curved recess at least along one quadrant. The tooth portions of the outer members can have a length equal to approximately one half the length of the correspondingly toothed edge of the link but offset therefrom so that these teeth can span the junction between adjacent links. The convex portion of the outer members can be truncated parallel to their toothed edges so as to form a linear guide surface against which a guide bar of the saw can abut in the cutting region to resist displacement of the blade. The saw can be provided with a pair of notched disks which serve as sprockets for displacing the chain. The sprockets are thus formed with angularly spaced outwardly concave peripheral recesses whose curvature conforms substantially to that of the inner edges of the links.

The above and other objects, features and advantages of the present invention will become more readily apparent from the following description, reference being made to the appended drawing in which:

FIG. 1 is a plan view of the link member of a chain-saw blade according to the invention;
FIG. 2 is a similar view of its pintle;
FIG. 3 is a plan view of one of the outer members prior to joining the pintle thereto;
FIG. 4 is a similar view of part of the chain assembly with portions removed for clarity;
FIG. 5 is a cross-sectional view taken along the line V—V of FIG. 4;
FIG. 6 is an exploded view of part of the assembly;
FIG. 7 is a side-elevational view of a chain saw employing the blade of FIG. 4, with parts broken away; and
FIG. 8 is a parallel cross-sectional view through the blade and motor housings of this saw.

The link 1 shown in FIG. 1 has a pair of laterally offset portions 7 and 8 which are joined by a transversely extending web 9. The parallel portions 7 and 8 are each formed with a respective bore 10 and have an arcuate inner edge 6 which conforms in configuration, substantially, to a semicircle centered on the axis 13 of each bore. Remote from the inner edge 6, along the cutting surface 4 of the link, there is provided a toothed edge 5 which is substantially parallel to an imaginary line drawn between the centers 13 of the bores 10. A pivot member such as the pintle 3 (FIG. 2) has a diameter approximately equal to that of the bores 10 and is adapted to fit rotatably into the latter. This pintle 3 has, however, a length (FIG. 5) which is substantially equal to or slightly greater than twice the thickness of the link 1. An outer member 2 can be affixed to the pintle 3 by, say, spot welding and a plurality of angularly equispaced locations 20. This outer member is formed with a convex pivotal portion 11 whose center is indicated at 13a and which is alignable with the centers 13 of the link 1. The diameter of pivotal portion 11 is equal approximately to that of semicircular inner edge 6. A segment 18 is cut away from this pivotal portion to form a guide surface 19 which is parallel to the toothed edge 5a of outer member 2 and to the line joining centers 13 of the associated link. These teeth are provided in an outrigger formation 12 which is integral with pivotal portion 11 and formed with a circular recess 14 whose curvature is substantially identical with that of the pivotal portion so as to be able to receive a pivotal portion of an adjacent outer member 2'. The radius r of the recess 14, which extends only over a lower quadrant, is equal to that of the pivotal portion but the center 13a' is spaced from center 13a thereof by a distance d which is equal to the spacing between the centers 13 and is slightly greater than twice this radius r. A ledge 17 is formed between each pair of adjacent outer members 2, 2' along one surface of the blade. Each outer member is also provided with an outer abutment 15 which can bear against a complementary surface 16 of the adjacent link. While abutment 15 lies substantially along a diameter of the arc 14, surface 16 lies along a diameter of the pivotal portion 11.

Referring now to FIG. 6 it may be seen that the pintle 3 is first welded abuttingly and centrally to the pivotal portion 11' of a link 2' so that the arcuate surface 14' of the latter is received within the groove 14 of the rearward link; the joining of the pintle to the outer member 2' is effected by spot welding at spaced points 20'. The pintle is then passed through the rearward bore 10 of the link 1 whereupon outer member 2' can be welded thereto by spot welding at longitudinally spaced points 21. The forward portion 8a with its bore 10a of a second link 1a is then slipped over the pintle 3 whereupon another outer member 2a is welded to the outer face 22 of the latter by spot welds 23 (FIG. 4). The two inner links 1, 1a can have their teeth 5, 5a either aligned or longitudinally offset by a fraction of the pitch of the teeth. Similarly the teeth 5', 5" of the outer members 2' and 2a can also be aligned with or offset from the teeth of the links 1 and 1a so that substantially four individual cutting blades are provided. To the rearward portion 7a of link 1a, the forward portion 8 of an adjacent link together with an additional pair of outer members 2 can be articulated. The guide surfaces 19 and 19a of the outer members 2' and 2a are disposed at a distance from the center 13a of rotation which is less than the radius of the pivotal portion so that the links 1, 1a project therebeyond and serve to support the blade upon suitable guide plates. Since the portions 7, 8 and 7a, 8a of the mutually adjacent links 1, 1a are transversely offset, the overlapping links have a thickness only of approximately twice that of the individual link. The method described for joining the links successively is employed to produce an endless chain which can be used in the device of FIGS. 7 and 8.

The chain saw illustrated in FIGS. 7 and 8 has a motor housing 32 in which the drive shaft 24 of, say, an electric motor is journaled so that its gear 25 meshes with an idler 25' which is rigid with a bevel gear 26. The latter, in turn, drives a bevel gear 27 which is rotatable within a bearing 27' and carries a stub shaft 28 and a sprocket disk 29. As can be seen in FIG. 7, this sprocket disk has a notched periphery with angularly spaced outwardly concave recesses 30, the curvature of which conforms substantially to that of the arcuate inner edges 6 of the links. A pair of support disks 39, one of which can be seen in FIG. 7, flanks the sprocket 29 to prevent axial dislocation of the chain 31. The housing is also provided with a pair of side walls 37 and 38 which extend parallel to the blade array 31 and are also formed from relatively thin material so that the total thickness of the saw is relatively minimal. These side walls, which may be composed of sheet metal, are rigidly affixed to the cast main housing portion 32 and are reinforced by a plurality of ribs 36. The walls are provided with a longitudinal opening 35 through which the blade is exposed and are closed around the remainder of their periphery by a wall 33. Remote from sprocket disk 29, there is journaled another sprocket disk 34 whose peripheral recesses are similarly shaped. Another pair of support disks 39' are provided for holding the blade against axial displacement on the sprocket 34. A pair of support members 40 (only one of which can be seen in FIG. 7) flanks the blade 31 and is spaced apart, along the longitudinal opening 35, by a distance just slightly greater than the thickness of the overlapping links 1 etc. Thus these plates 40, which are affixed to each side wall 37, 38, support the blade against displacement transverse to the plane of the link array. Additionally, these plates are provided with guide surfaces 40', which extend parallel to the opening 35, in abutting relationship with the linear surfaces 19 of the outer member lationship with the linear guide surfaces 19 of the outer member 2 etc. The blade 31 is thus supported against inward deflection during use for cutting.

The cast housing 32 can be provided with an eye 43 along its upper surface to enable it to be supported by a balancing spring or counterweight arrangement in the usual manner. Additionally, a guide handle 42 can be provided along one lateral face of the housing while a displacing handle 41 is formed along the other. Rotation of the driven sprocket 29 results in a concurrent rotation of the chain blade and permits the severing of large and small animal carcasses without difficulty. The thickness of each composite link 1 etc. can be approximately 2 mm. with the overall width of the saw in the region of the blade being on the order of 1.5 cm. so that a relatively fine cut can be made without material waste.

While the invention has been described with reference to a chain saw suitable for use in the meat-packing industry, it should be noted that only slight modifications, well within the spirit and scope of the invention as defined in the appended claims, are necessary to render it suitable for other purposes.

I claim:
1. A chain-saw blade comprising a generally planar array of peripherally toothed links of sheet material substantially parallel to the plane of said array, said links each overlapping a pair of adjcent links on opposite sides thereof while being in surface contact with said adjacent links; individual pivot means spaced along said array for articulating the links of each pair to the intervening link for relative rotation about respective axes perpendicular to said plane, each of said links overlying one of the links of the respective pair of said adjacent links while being overlain by the other link of the respective pair, each of said links being formed with two mutually parallel portions relatively offset transverse to said plane by a distance equal substantially to the thickness of said links but parallel to said plane; and a pair of generally flat toothed outer members flanking one of said portions of each of said links and secured thereto at one of said pivot means.

2. A chain-saw blade as defined in claim 1 wherein said links are each provided with a toothed outer edge parallel to a line through the respective pivot means.

3. A chain-saw blade comprising a generally planar array of peripherally toothed links of sheet material substantially parallel to the plane of said array, said links each overlapping a pair of adjcent links on opposite sides thereof while being in surface contact with said adjacent links; individual pivot means spaced along said array for articulating the links of each pair to the intervening links for relative rotation about respective axes perpendicular to said plane, each of said links overlying one of the links of the respective pair of said adjacent links while being overlain by the other link of the respective pair, each of said links being formed with two mutually parallel portions relatively offset transverse to said plane by a distance equal substantially to the thickness of said links but parallel to said plane, and a pair of generally flat outer members flanking one of said portions of each of said links and secured thereto at one of said pivot means, said links each being provided with a toothed outer edge parallel to a line through the respective pivot means, at least one of the outer members associated with each link being formed with an array of teeth along an edge corresponding to said outer edge of the respective link.

4. A chain-saw blade comprising a generally planar array of peripherally toothed links of sheet material substantially parallel to the plane of said array, said links each overlapping a pair of adjaecnt links on opposite sides thereof while being in surface contact with said adjacent links; individual pivot means spaced along said array for articulating the links of each pair to the intervening link for relative rotation about respective axes perpendicular to said plane, each of said links overlying one of the links of the respective pair of said adjacent links while being overlain by the other link of the respective pair, each of said links being formed with two mutually parallel portions relatively offset transverse to said plane by a distance equal substantially to the thickness of said links but parallel to said plane, and a pair of generally flat outer members flanking one of said portions of each of said links and secured thereto at one of said pivot means, said links each being provided with a toothed outer edge parallel to a line through the respective pivot means, each of said pivot means including a pair of axially registering bores formed in overlapping portions of two adjacent links and a pintle rigid with the respective pair of outer members passing through each of said pairs of bores.

5. A chain-saw blade as defined in claim 4 wherein each of said links is formed with a pair of arcuate inner edges remote from said outer edge, each of said arcuate edges being concentric with one of the respective bores.

6. A chain-saw blade as defined in claim 5 wherein the toothed edge of said one of the outer members associated with each link is substantially coextensive with said outer edge of the latter, said one on said outer members having a convex arcuate pivotal portion with a radius equal substantially to that of a corresponding inner edge and concentric therewith, and a concave portion having a radius of curvature equal substantially to that of said pivotal portion but concentric with the other inner edge of the respective link to enable it to receive the pivotal portion of an adjacent outer member.

7. A chain-saw blade as defined in claim 6 wherein said concave portion extends substantially over a quadrant intermediate said line and said toothed edge.

8. A chain-saw blade as defined in claim 6 wherein said convex portion of each of said members is formed with a linear guide surface parallel to said line at a distance from the center of the convex portion less than the radius of the respective inner edge whereby said portions of said links extend beyond said guide surface away from said toothed outer edge.

9. A chain-saw blade as defined in claim 4 wherein said pintle has a length equal substantially to twice the thickness of a link.

10. A chain saw comprising a housing, motor means in said housing, and a pair of transversely spaced sprocket members rotatable about parallel axes, and an endless chain-saw blade passing around said sprocket members, said blade comprising a generally planar array of peripherally toothed links of sheet material substantially parallel to the plane of said array, said links each overlapping a pair of adjacent links on opposite sides thereof while being in surface contact with said adjacent links; individual pivot means spaced along said array for articulating the links of each pair to the intervening link for relative rotation about respective axes perpendicular to said plane, each of said links overlying one of the links of the respective pair of said adjacent links while being overlain by the other link of the respective pair, each of said links being formed with two mutually parallel portions relatively offset transverse to said plane by a distance equal substantially to the thickness of said links but parallel to said plane, and a pair of generally flat outer members flanking one of said portions of each of said links and secured thereto at one of said pivot means, said links each being provided with a toothed outer edge parallel to a line through the respective pivot means, each of said pivot means including a pair of axially registering bores formed in overlapping portions of two adjacent links and a pintle rigid with the respective pair of outer members passing through each of said pairs of bores.

11. A chain saw as defined in claim 10 wherein said housing comprises a pair of elongated side walls extending generally parallel to said array and partly enclosing said chain, said housing being provided with an opening along one longitudinal edge thereof to expose the toothed periphery of said chain.

12. A chain saw as defined in claim 11, further comprising guide means disposed in said housing between said side walls for supporting said chain against inward displacement along said longitudinal edge, said links being provided with linear guide surfaces engageable with said guide means.

13. A chain saw as defined in claim 12, further comprising support means along said longitudinal edge engageable with said links for limiting displacement thereof in a direction transverse to the plane of said array, and reinforcing means bridging said side walls within said housing.

References Cited by the Examiner
UNITED STATES PATENTS

| | | | |
|---|---|---|---|
| 1,642,145 | 9/1927 | Ferguson | 143—135 |
| 1,825,164 | 9/1931 | Skillman | 143—32 |
| 1,891,105 | 12/1932 | Meyer | 143—32 |
| 2,152,139 | 3/1939 | Fulke | 29—434 |
| 2,595,884 | 5/1952 | Reid | 143—135 |
| 2,605,788 | 8/1952 | Reid | 143—135 |
| 2,854,866 | 10/1958 | Mall et al. | 76—112 |
| 2,891,586 | 6/1959 | Wright | 143—135 |

WILLIAM W. DYER, JR., *Primary Examiner.*
DONALD R. SCHRAN, *Examiner.*